(12) United States Patent
Kim (10) Patent No.: US 12,344,327 B2
(45) Date of Patent: Jul. 1, 2025

(54) CORNER MODULE FOR VEHICLE

(71) Applicants: Hyundai Motor Company, Seoul (KR); Kia Corporation, Seoul (KR)

(72) Inventor: Jae Hun Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/606,598

(22) Filed: Mar. 15, 2024

(65) Prior Publication Data
US 2025/0162643 A1    May 22, 2025

(30) Foreign Application Priority Data
Nov. 20, 2023    (KR) .................. 10-2023-0161383

(51) Int. Cl.
*B62D 5/04* (2006.01)
*B60G 15/07* (2006.01)
*B62D 7/08* (2006.01)

(52) U.S. Cl.
CPC ........... *B62D 5/0418* (2013.01); *B60G 15/07* (2013.01); *B62D 7/08* (2013.01); *B60G 2200/44* (2013.01); *B60G 2202/21* (2013.01); *B60G 2204/1242* (2013.01); *B60G 2204/129* (2013.01); *B60G 2204/4104* (2013.01)

(58) Field of Classification Search
CPC ........ B62D 5/0418; B62D 7/08; B60G 15/07; B60G 2200/44; B60G 2202/21; B60G 2204/1242; B60G 2204/129; B60G 2204/4104
See application file for complete search history.

(56) References Cited

U.S. PATENT DOCUMENTS

| | | | | |
|---|---|---|---|---|
| 3,811,664 | A * | 5/1974 | Spinks | B60G 15/07 267/66 |
| 4,341,396 | A * | 7/1982 | Decouzon | B60G 15/07 280/124.145 |
| 4,478,396 | A * | 10/1984 | Kawaura | B60G 15/068 267/141.1 |
| 4,648,623 | A * | 3/1987 | Cameron | F16F 9/084 280/86.754 |
| 4,711,463 | A * | 12/1987 | Knable | B60G 13/001 267/195 |
| 6,079,722 | A * | 6/2000 | Kato | B60G 3/265 280/124.1 |
| 11,148,500 | B2 * | 10/2021 | Shim | B60G 15/063 |
| 11,506,251 | B2 * | 11/2022 | Mohammadi | B60G 13/06 |

(Continued)

FOREIGN PATENT DOCUMENTS

| | | | | |
|---|---|---|---|---|
| CN | 111469621 | A * | 7/2020 | ............. B60G 13/00 |
| JP | H07132722 | A * | 5/1995 | ....... B60G 2204/124 |

(Continued)

*Primary Examiner* — Faye M Fleming
(74) *Attorney, Agent, or Firm* — Slater Matsil, LLP (57) ABSTRACT

An embodiment corner module includes a steering unit configured to receive torque from a steering motor, a damper connected to the steering unit and connectable to a wheel, and a vibration insulation structure disposed at a portion where the steering unit and the damper are connected to each other, wherein the vibration insulation structure includes a lower bush and an upper bush stacked in a vertical direction.

20 Claims, 10 Drawing Sheets

(56) References Cited

U.S. PATENT DOCUMENTS

| | | | |
|---|---|---|---|
| 11,673,446 B2* | 6/2023 | Friedl | B60G 17/0272 |
| | | | 267/218 |
| 2023/0144878 A1 | 5/2023 | Kwon et al. | |
| 2023/0202287 A1 | 6/2023 | Park et al. | |
| 2024/0308287 A1* | 9/2024 | Shrivastava | F16F 1/371 |

FOREIGN PATENT DOCUMENTS

| KR | 20230068168 A | 5/2023 |
|---|---|---|
| KR | 20230098457 A | 7/2023 |

\* cited by examiner

Wheel center

300a ⎫
         ⎬ 300
300b ⎭

Example of setting bush hardness

Toe in

FIG. 10

CORNER MODULE FOR VEHICLE

CROSS-REFERENCE TO RELATED APPLICATIONS

This application claims the benefit of Korean Patent Application No. 10-2023-0161383, filed on Nov. 20, 2023, which application is hereby incorporated herein by reference in its entirety.

TECHNICAL FIELD

The present disclosure relates to a corner module for a vehicle.

BACKGROUND

In a typical steering apparatus, a rack-and-pinion steering apparatus pushes a tie rod to create a steering angle of a vehicle. When a rack bar is pushed left and right through the rotation of the pinion, the tie rod connected to the rack bar pushes knuckle arms of wheels to generate a steering moment.

However, with an existing steering apparatus, since it is difficult to increase the steering angle of wheels beyond a predetermined angle, the steering angle of a vehicle is limited, and since the left and right wheels are steered simultaneously via the left and right links of the steering apparatus, it is impossible to steer the left and right wheels independently.

Accordingly, recently, vehicles having corner modules which enable 360-degree rotation for each wheel have been researched and developed.

Such vehicles can be differentiated in terms of short turning radius and mobility operation characteristics through the corner modules and achieve high space efficiency.

However, in the case of corner modules, due to the structure of being installed individually for each wheel, it is necessary to apply a structure effectively insulating vibration while ensuring the rigidity of the wheels and tires against external force.

The foregoing described as the background art is intended merely to aid in the understanding of the background of embodiments of the present disclosure and is not intended to mean that this information falls within the purview of the publicly available related art.

SUMMARY

The present disclosure relates to a corner module for a vehicle. Particular embodiments relate to a corner module for a vehicle that effectively insulates vibration while ensuring the rigidity of a wheel and a tire against external force.

Embodiments of the present disclosure can solve problems occurring in the prior art, and an exemplary embodiment provides a corner module for a vehicle that effectively insulates vibration while ensuring the rigidity of a wheel and a tire against external force.

In view of the foregoing, a configuration of a corner module for a vehicle may include a steering unit provided with torque from a steering motor and rotatably coupled to a vehicle body, a plurality of dampers connected between the steering unit and a wheel, and a vibration insulation structure in which a lower bush and an upper bush are stacked up and down at a portion where the steering unit and each of the dampers are connected to each other so that vibration insulation is ensured.

In the steering unit coupled to the vehicle body at one end thereof, a bush assembly hole may be formed at the other end of the steering unit branched from the one end toward the dampers, a damper shaft formed at the upper end of the damper may protrude upward through the bush assembly hole, and the lower bush and the upper bush may be supported in the bush assembly while being fitted onto the damper shaft.

A support portion may protrude on the inner surface of the bush assembly hole, and the lower bush and the upper bush may be stacked up and down and assembled while being supported on upper and lower ends of the support portion, respectively.

A nut is fastened to the upper end of the damper shaft so that the lower bush and the upper bush can be pressed and assembled.

A spring seat may be fixed to the damper, a spring seating surface may be formed on the steering unit, and a damper spring may be supported between the spring seat and the spring seating surface.

Another configuration of a corner module for a vehicle of embodiments of the present disclosure may include a steering unit provided with torque from a steering motor and rotatably coupled to a vehicle body, a plurality of dampers connected between the steering unit and a wheel, and a vibration insulation structure configured to have different hardnesses at portions where the steering unit and each of the dampers are connected so that vibration insulation is ensured.

The dampers may be provided before and after a rotary shaft of the wheel, respectively.

The vibration insulation structure may include vibration insulators having different hardnesses at portions, respectively, where the steering unit and each of the dampers are connected.

The vibration insulation structure may include a vibration insulator only at one of the portions where the steering unit and each damper are connected.

The vibration insulator may be configured to have a structure in which the lower bush and the upper bush are stacked up and down.

The lower bush and the upper bush may have different hardnesses.

The lower bush may have a higher hardness than the upper bush.

In a front wheel, the vibration insulation structure for a front damper and the steering unit has a higher hardness than the vibration insulation structure for a rear damper and the steering unit, and in a rear wheel, the vibration insulation structure for a front damper and the steering unit has a lower hardness than the vibration insulation structure for a rear damper and the steering unit.

With the above-described features, according to embodiments of the present disclosure, by providing a plurality of dampers between the wheel and the steering unit, the rigidity of a wheel and a tire can be ensured, and by adopting a vibration insulation structure in which bushes are stacked up and down in the portion where the dampers and the steering unit are connected to each other, vibration can be effectively insulated, and the degree of freedom capable of absorbing the friction between the two dampers that occurs due to manufacturing/assembly errors of components can be ensured.

Moreover, by configuring the front and rear bushes assembled between the dampers and the steering unit to have different hardnesses, the center of the wheel is moved from a bush side with a higher hardness toward a bush side with a lower hardness. Accordingly, wheel alignment characteristics such as caster, camber, and toe can be changed, which has the effect of improving the marketability of a vehicle by securing freedom in the design/development of the vehicle.

BRIEF DESCRIPTION OF THE DRAWINGS

The above and other aspects, features, and advantages of embodiments of the present disclosure will be more apparent from the following detailed description taken in conjunction with the accompanying drawings, in which.

DETAILED DESCRIPTION OF ILLUSTRATIVE EMBODIMENTS

Hereinafter, embodiments disclosed in the present specification will be described in detail with reference to the accompanying drawings, and the same or similar elements are given the same and similar reference numerals, so duplicate descriptions thereof will be omitted.

The terms "module" and "unit" used for the elements in the following description are given or interchangeably used in consideration of only the ease of writing the specification, and they do not have distinct meanings or roles by themselves.

In describing the embodiments disclosed in the present specification, when the detailed description of the relevant known technology is determined to unnecessarily obscure the gist of the present disclosure, the detailed description may be omitted. Furthermore, the accompanying drawings are provided only for easy understanding of the embodiments disclosed in the present specification, and the technical spirit disclosed herein is not limited to the accompanying drawings, and it should be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for the purpose of distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless they are definitely different in a context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Embodiments of the present disclosure will be described in detail with the accompanying drawings as follows.

A corner module 10 for a vehicle of embodiments of the present disclosure includes a steering unit 100 rotatably coupled to a vehicle body 20 and provided with torque from a steering motor M, a plurality of dampers 200 connected between the steering unit 100 and a wheel 400, and a vibration insulation structure in which a lower bush 310 and an upper bush 320 are stacked up and down at portions where the steering unit 100 and each damper 200 are connected to each other so that vibration insulation is ensured.

Referring to FIGS. 1 to 4, the corner module 10 is provided in each of the portions where front wheels 400a and rear wheels 400b are located in a four-wheeled vehicle, a four-wheeled mobility, or the like so that each wheel 400 is independently steered by the corner module 10.

For this purpose, the steering motor M is provided for each corner module 10, and the steering motor M is fixed to an upper portion of the vehicle body 20. The steering motor M may be directly fixed to the vehicle body 20, but in a structure in which the steering motor M is covered by a housing, the housing may be fixed to the vehicle body 20.

In addition, the steering unit 100 is assembled to the vehicle body 20 under the steering motor M, and a shaft of the steering motor M extends downward and is connected to one end of the steering unit 100, whereby torque provided from the steering motor M is provided to the steering unit 100 so that the steering unit 100 can be steered and rotated with respect to the vehicle body 20 around the shaft of the steering motor M.

In addition, dampers 200 are connected at the front and rear between the steering unit 100 and the wheel 400, respectively.

The dampers 200 may be hydraulic shock absorbers and may each include an inner tube 210 and an outer tube 220.

Specifically, a knuckle 410 is assembled to the side of the wheel 400 to enable relative rotation, and the outer tubes 220 are fixed to the front and rear ends of the knuckle 410.

In addition, in the state in which the inner tubes 210 are inserted into the upper portions of the outer tubes 220, respectively, the inner tubes 210 are damp-driven vertically along the longitudinal direction by hydraulic pressure to absorb vibration in the vertical direction.

For reference, each wheel 400 may be equipped with an in-wheel motor. Accordingly, each wheel can be rotated independently by the driving force provided by the in-wheel motor.

In particular, a vibration insulation structure is provided at the portion where the front and rear dampers 200 and the steering unit 100 are connected to each other.

Preferably, the vibration insulation structure includes lower and upper bushes 310 and 320 which are stacked up and down, and the lower and upper bushes 310 and 320 may be made of rubber.

That is, since the corner module 10 of embodiments of the present disclosure has a structure in which two dampers 200 simultaneously operate up and down at the front and rear, the degree of parallelism between the axes of the two dampers 200 is an important factor in order to ensure the degree of freedom between individual components in the process of operating up and down.

However, when a machining tolerance occurs between the holes in the steering unit 100 to which the dampers 200 are assembled and the holes in the knuckle 410, the axes of the two dampers 200 are not parallel. Thus, when the dampers 200 operate, the friction force may become excessive and an abnormal load may be excessively applied to the assembly portions.

In this regard, a method of adjusting the degree of parallelism during the processing of the steering unit 100 and the knuckle 410 may be considered, but this results in an increase in time and cost with a slight improvement in effect.

Therefore, while ensuring the rigidity of the wheel 400 and the tire by providing the plurality of dampers 200 between the wheel 400 and the steering unit 100, embodiments of the present disclosure ensure effective vibration insulation and the degree of freedom to absorb friction occurring between the two dampers 200 due to manufacturing/assembly errors of components by adopting the vibration insulation structure in which bushes are stacked up and down at the portions where the dampers 200 and the steering unit 100 are connected to each other.

In addition, in embodiments of the present disclosure, bush assembly holes 110 are formed at the other end of the steering unit 100, which is branched toward the dampers 200 from one end of the steering unit 100 coupled to the vehicle body 20, damper shafts 230 formed at the upper ends of the dampers 200 protrude upward through the bush assembly holes 110, respectively, and the lower and upper bushes 310 and 320 can be assembled into each of the bush assembly holes 110 while being fitted onto each of the damper shafts 230.

Figure 1:
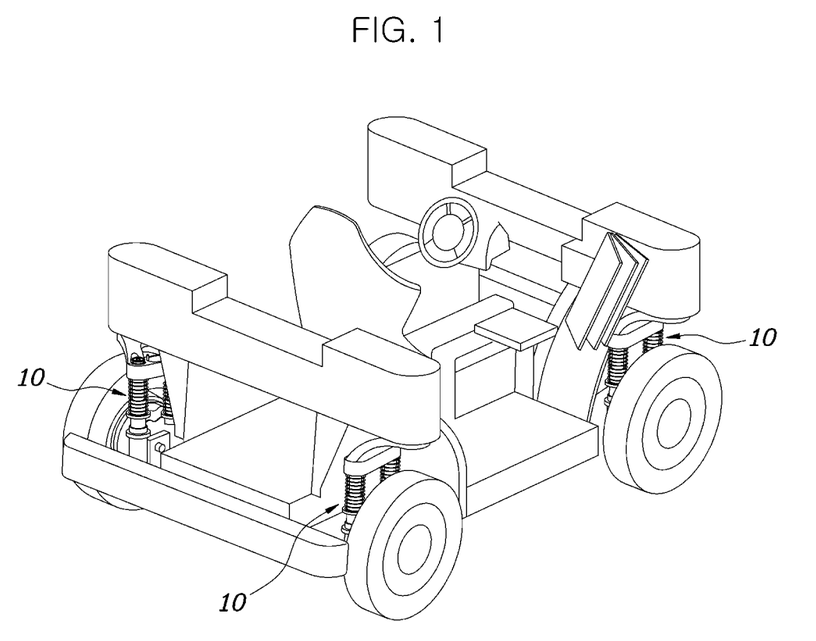
FIG. 1 is a view illustrating a mobility to which corner modules of embodiments of the present disclosure are applied.
Figure 2:
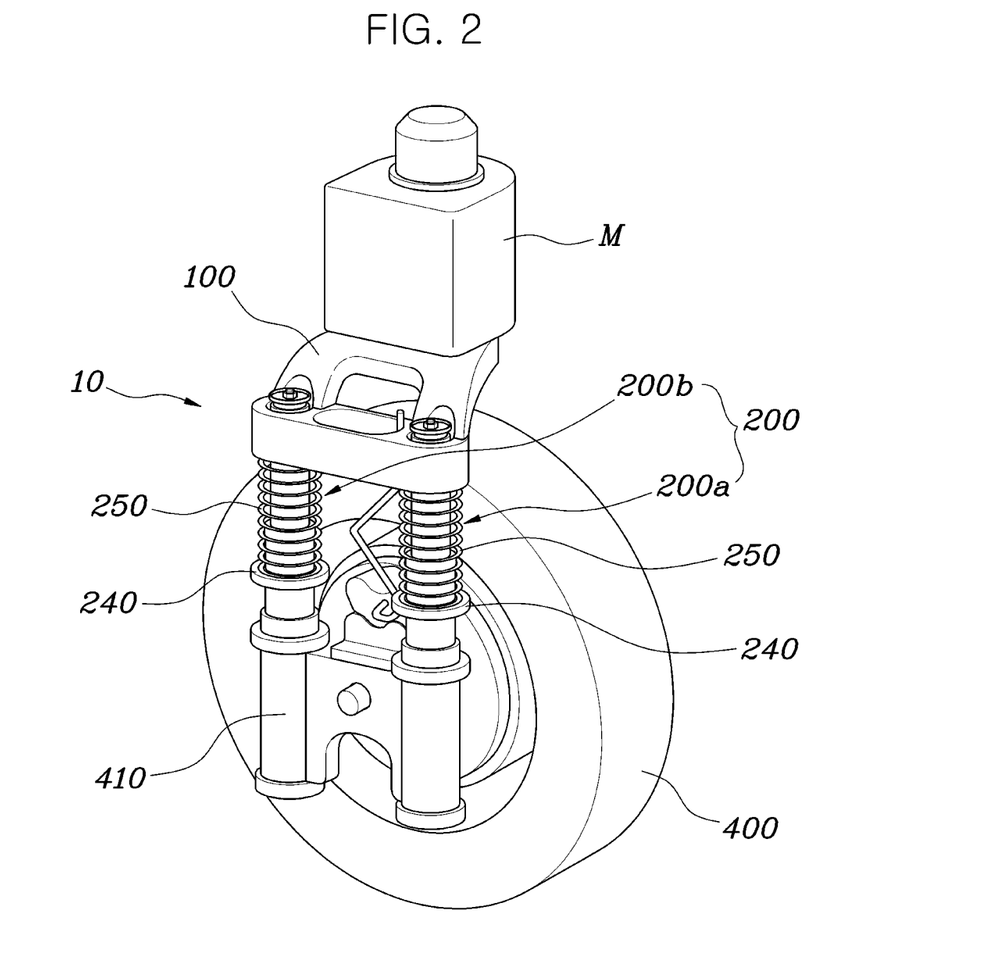
FIG. 2 is a view illustrating a corner module of embodiments of the present disclosure.
Figure 3:
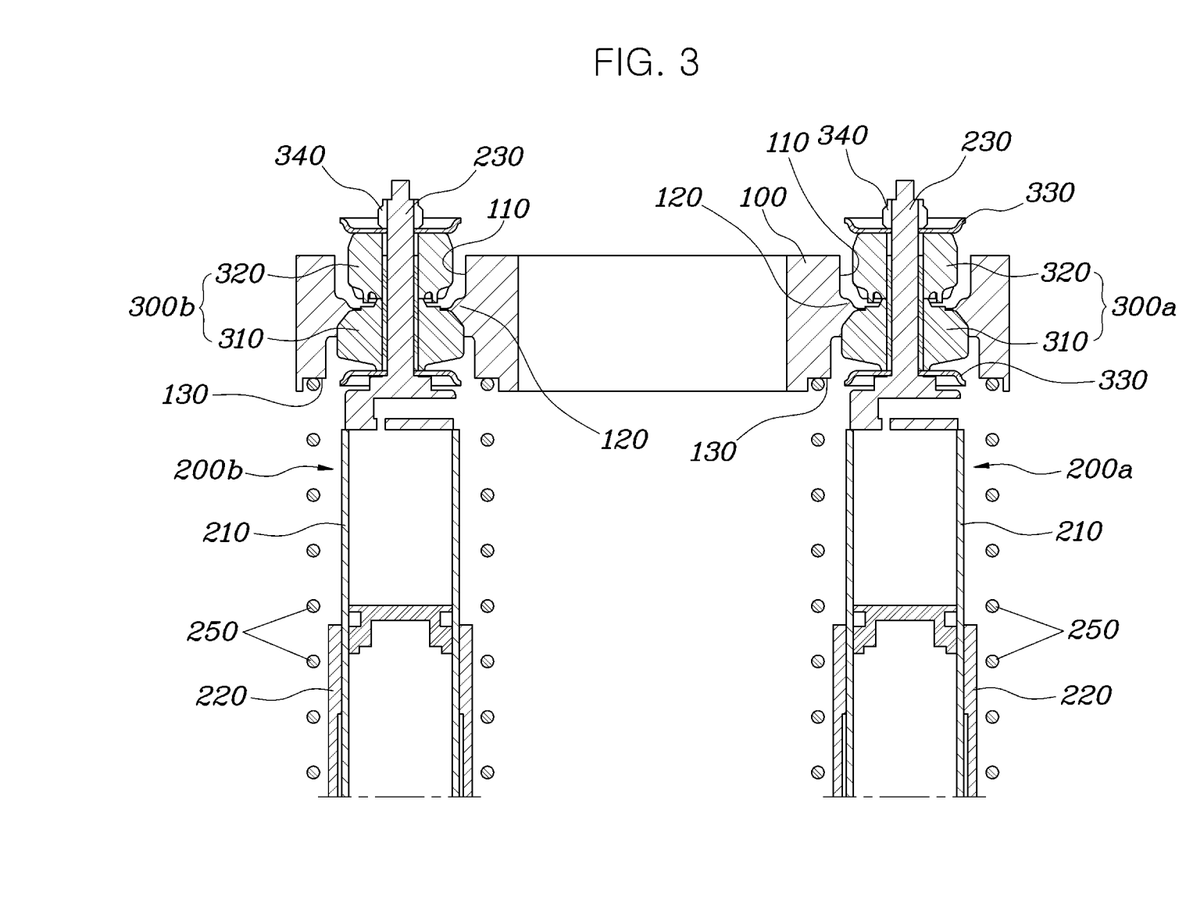
FIG. 3 is a view illustrating a vibration insulator structure of embodiments of the present disclosure.
Figure 4:
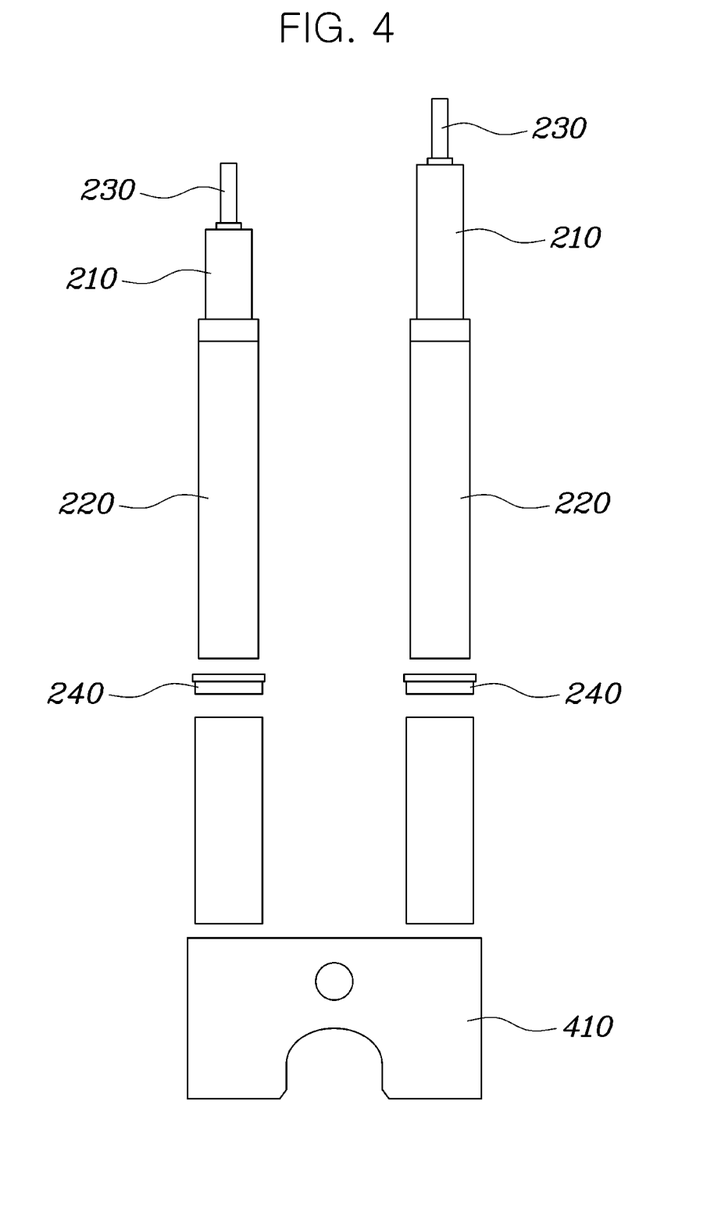
FIG. 4 is a view illustrating dampers of embodiments of the present disclosure in a separated state.

Referring to FIG. 3, the one end of the steering unit 100 is rotatably coupled to the vehicle body 20, the steering unit 100 is branched forward and rearward from the one end to the other end, and the bush assembly holes 110 are formed at the branched portions, respectively.

The bush assembly holes 110 have a circular cross-sectional shape and are hollow in the vertical direction.

In addition, damper shafts 230 protrude upward from the centers of the upper ends of the inner tubes 210 of the dampers 200 and penetrate the bush assembly holes 110 vertically upward, respectively.

In particular, the lower and upper bushes 310 and 320 are stacked up and down, are fitted onto the damper shafts 230, and are supported within the bush assembly holes 110, respectively.

In detail, a support portion 120 is formed to protrude from the inner surface of each bush assembly hole 110, and the lower and upper bushes 310 and 320 can be stacked up and down and assembled while being supported on the upper and lower ends of the support portion 120, respectively.

That is, as the lower and upper bushes 310 and 320 are stacked up and down, the top surface of the lower bush 310 is supported by the bottom surface of the support portion 120, and the bottom surface of the upper bush 320 is supported by the top surface of the support portion 120.

Therefore, since the vibrations in the upper and lower portions of the support portion 120 are insulated via the lower bush 310 and the upper bush 320, vibration at the connection portions between the damper 200 and the steering unit 100 can be more effectively insulated.

In addition, in embodiments of the present disclosure, a nut 340 may be fastened to the upper end of the damper shaft 230 so that the lower bush 310 and the upper bush 320 can be pressed and assembled.

That is, a washer 330 may be fitted and assembled on the top surface of the upper bush 320, and the nut 340 may be fastened on the washer 330 so that the upper bush 320 can be pressed and assembled to the lower bush 310.

At this time, a washer 330 may also be fitted and assembled on the bottom surface of the lower bush 310.

In addition, spring seats 240 may be fixed to the dampers 200, and spring seating surfaces 130 may be formed on the steering unit 100 to support damper springs 250 between the spring seats 240 and the spring seating surfaces 130.

For example, the spring seats 240 may be fixed to the outer surfaces of the outer tubes 220, and the spring seating surfaces 130 may be formed at the bottom of the steering unit 100 bordering the lower ends of the bush assembly holes 110.

In addition, the damper springs 250 are formed as coil springs, so that the lower ends thereof are supported on the spring seats 240 and the upper ends thereof are supported on the spring seating surfaces 130.

Accordingly, since the load input to the corner modules 10 is distributed through the damper springs 250 and the dampers 200, vibration occurring due to changes in the vertical direction of the wheel 400 in bumping and rebounding situations while the vehicle is running is more effectively absorbed.

The corner module 10 for a vehicle of embodiments of the present disclosure includes the steering unit 100 rotatably coupled to the vehicle body 20 and provided with torque from the steering motor M, the plurality of dampers 200 connected between the steering unit 100 and the wheel 400, and a vibration insulation structure configured to have different hardnesses at portions where the steering unit 100 and each damper 200 are connected to each other so that vibration insulation is ensured.

Since the steering unit 100 and the dampers 200 have been described above, their description will be omitted below.

Figure 5:
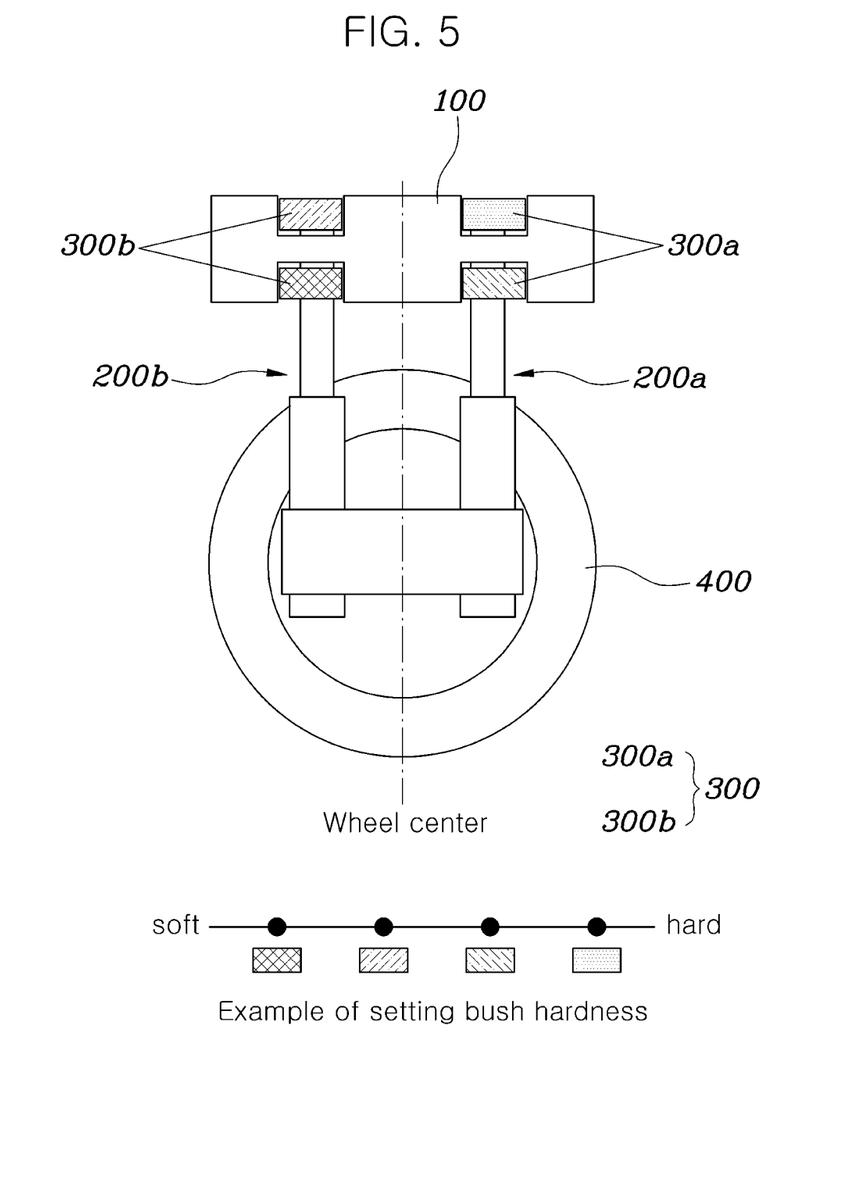
FIG. 5 is a view exemplifying a configuration in which lower bushes and upper bushes of front and rear vibration insulators have different hardnesses.
Figure 6:
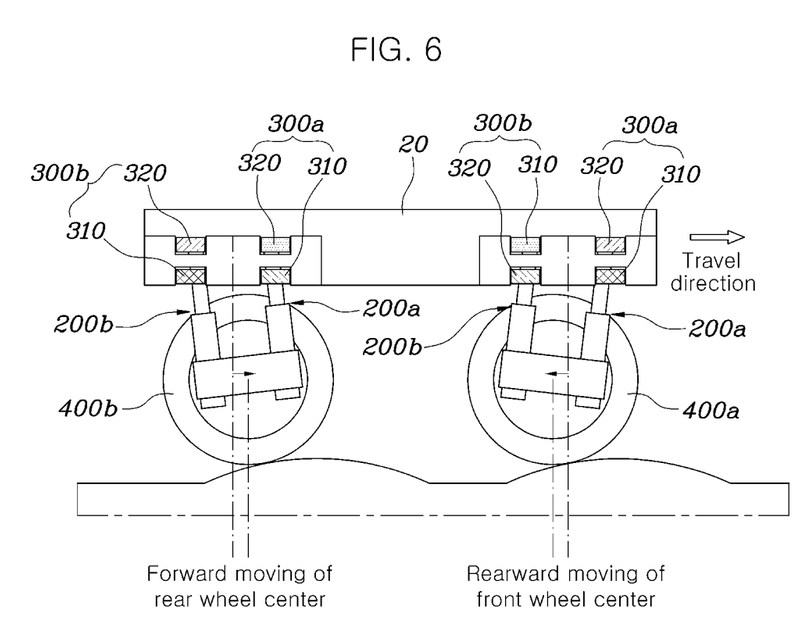
FIG. 6 is a view illustrating the behavior of front and rear wheels when the corner module of embodiments of the present disclosure is applied to each of the front and rear wheels.

Referring to FIGS. 5 and 6, a vibration insulation structure is configured to have different hardnesses at a portion where the front damper 200*a* and the steering unit 100 are connected to each other and a portion where the rear damper 200*b* and the steering unit 100 are connected to each other.

Accordingly, of the portions where the front damper 200*a* and the rear damper 200*b* are connected, the connecting portion having a relatively lower hardness is pressed more downward than the connecting portion having a higher hardness by the weight of the vehicle.

Therefore, since the center of the wheel 400 is moved from the connecting portion of the damper 200, which has a relatively higher hardness, to the connecting portion of the damper 200, which has a lower hardness, wheel alignment characteristics such as caster, camber, and toe can be changed, thereby securing the degree of freedom in vehicle design/development and improving the marketability of the vehicle.

In addition, in embodiments of the present disclosure, the dampers 200 may be provided before and after the rotary shaft of the wheel 400, respectively.

That is, the front damper 200a is provided at the front of the rotary shaft, and the rear damper 200b is provided at the rear of the rotary shaft.

In particular, as an embodiment of the above-mentioned vibration insulation structure, vibration insulators 300 having different hardnesses may be provided at portions where the steering unit 100 and the dampers 200 are connected, respectively.

Referring to FIG. 5, a vibration insulator 300a is provided at the connecting portion between the front damper 200a and the steering unit 100, and a vibration insulator 300b is also provided at the connecting portion between the rear damper 200b and the steering unit 100. Here, the vibration insulators 300 may be bushes made of a rubber material, and the vibration insulators 300 may be made of bushes with a hardness lower than that of general bushes.

However, the front vibration insulator 300a may be set to have a lower hardness than the rear vibration insulator 300b. In this case, the front vibration insulator 300a side, which has a lower hardness, is pressed further downward than the rear vibration insulator 300b side due to the weight of the vehicle so that the center of the wheel 400 is moved forward.

In contrast, in the case where the rear vibration insulator 300b may be set to have a lower hardness than the front vibration insulator 300a, the rear vibration insulator 300b side, which has a lower hardness, is pressed further downward than the front vibration insulator 300a side due to the weight of the vehicle so that the center of the wheel 400 is moved rearward.

As another embodiment of the vibration insulation structure, a vibration insulator 300 may be provided at only one of the portions where the steering unit 100 and the dampers 200 are connected.

Figure 7:
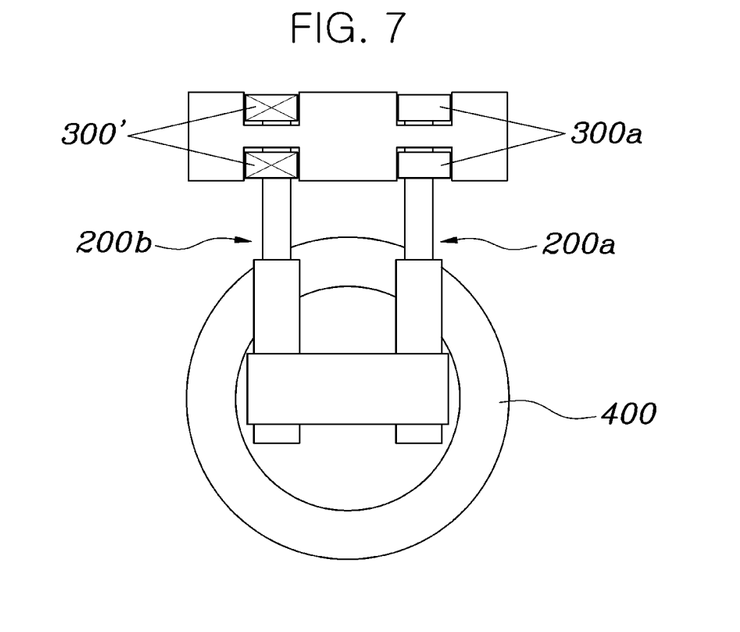
FIG. 7 is a view illustrating a configuration in which the vibration insulator of embodiments of the present disclosure is applied to a front damper.

Referring to FIG. 7, a vibration insulator 300a may be provided at the connecting portion between the front damper 200a and the steering unit 100, and no vibration insulator may be provided at the connecting portion between the rear damper 200b and the steering unit 100. When a vibration insulator 300 is not provided, a general vibration insulator 300' having a higher hardness than the vibration insulator 300 may be provided, or no vibration insulator may be provided.

In this case, the front vibration insulator 300a side, which has a lower hardness, is pressed further downward than the rear side due to the weight of the vehicle so that the center of the wheel 400 is moved forward.

Figure 8:
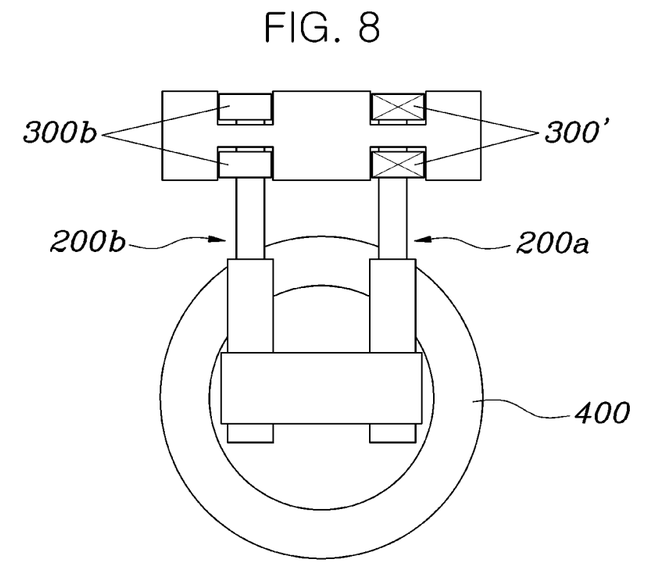
FIG. 8 is a view illustrating a configuration in which the vibration insulator of embodiments of the present disclosure is applied to a rear damper.

In contrast, as illustrated in FIG. 8, the vibration insulator 300b may be provided at the connecting portion between the rear damper 200b and the steering unit 100, and no vibration insulator may be provided at the connecting portion between the front damper 200a and the steering unit 100.

In this case, the rear vibration insulator 300b side, which has a lower hardness, is pressed further downward than the front side due to the weight of the vehicle so that the center of the wheel 400 is moved rearward.

In addition, the vibration insulator 300 may have a structure in which the lower bush 310 and the upper bush 320 are stacked up and down.

Referring to FIG. 5, the vibration insulators 300 may be configured by stacking bushes up and down.

Accordingly, when the sum of the hardnesses of the lower bush 310 and the upper bush 320 constituting the front vibration insulator 300a is less than the sum of the hardnesses of the lower bush 310 and the upper bush 320 constituting the rear vibration insulator 300b, the front vibration insulator 300a side, which has a lower hardness, is pressed more than the rear vibration insulator 300b side so that the center of the wheel 400 is moved forward.

In contrast, when the sum of the hardnesses of the lower bush 310 and the upper bush 320 constituting the rear vibration insulator 300b is less than the sum of the hardnesses of the lower bush 310 and the upper bush 320 constituting the front vibration insulator 300a, the rear vibration insulator 300b side, which has a lower hardness, is pressed more than the front vibration insulator 300a side so that the center of the wheel 400 is moved rearward.

In addition, the lower bushes 310 and the upper bushes 320 may have different hardnesses.

That is, the lower bush 310 and the upper bush 320 constituting each vibration insulator 300 may have different hardnesses.

Preferably, the lower bush 310 may have a higher hardness than the upper bush 320.

Of course, the upper bush 320 may have a higher hardness than the lower bush 310. However, in both cases, the sum of the hardnesses of the lower bush 310 and the upper bush 320 constituting the front vibration insulator 300a is configured to be higher than the sum of the hardnesses of the lower bush 310 and the upper bush 320 constituting the rear vibration insulator 300b.

Meanwhile, in embodiments of the present disclosure, in the front wheel 400a, the vibration insulation structure of the front damper 200a and the steering unit 100 is configured to have a higher hardness than the vibration insulation structure of the rear damper 200b and the steering unit 100, and in the rear wheel 400b, the vibration insulation structure between the front damper 200a and the steering unit 100 may be configured to have a lower hardness than the vibration insulation structure between the rear damper 200b and the steering unit 100.

Referring to FIG. 6, in the case of the front wheel 400a, the hardness of the front vibration insulator 300a connected between the front damper 200a and the steering unit 100 is set to be higher than that of the rear vibration insulator 300b connected between the rear damper 200b and the steering unit 100.

Accordingly, the rear vibration insulator 300b is pressed further downward than the front vibration insulator 300a due to the weight of the vehicle, and the center of the front wheel 400a is moved rearward by about 2 to 8 mm.

In addition, in the case of the rear wheel 400b, the hardness of the front vibration insulator 300a connected between the front damper 200a and the steering unit 100 is set to be lower than that of the rear vibration insulator 300b connected between the rear damper 200b and the steering unit 100.

Accordingly, the front vibration insulator 300a is pressed further downward than the rear vibration insulator 300b due to the weight of the vehicle, and the center of the rear wheel 400b is moved frontward by about 2 to 8 mm.

Accordingly, the centers of the wheels 400 are moved from the vibration insulator 300 with a relatively higher hardness toward the vibration insulators 300 with a lower hardness, and through this, the hardnesses of the front and rear vibration insulators 300 may be appropriately tuned to achieve a desired compliance characteristic.

Figure 9:
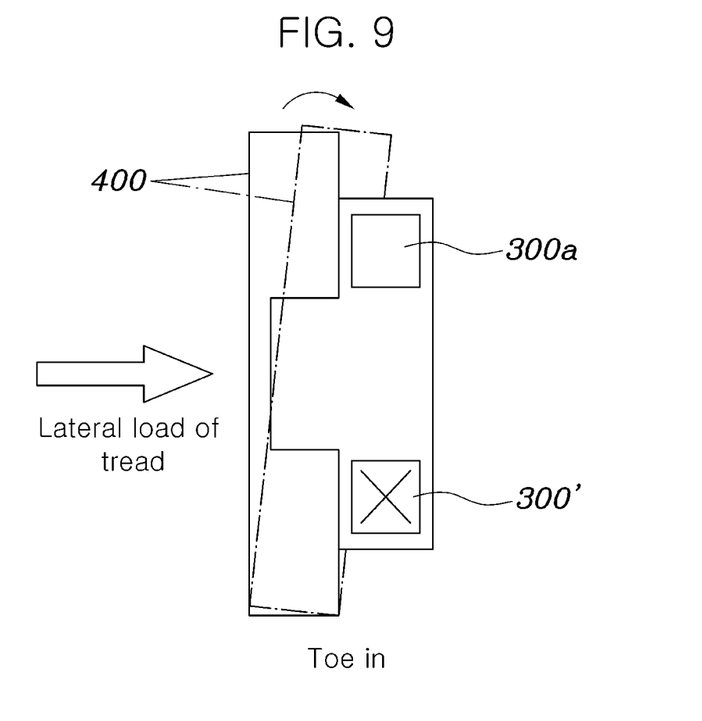
FIG. 9 is a view illustrating the behavior of a wheel in response to a lateral load input when the corner module of FIG. 7 is applied to the wheel.
Figure 10:
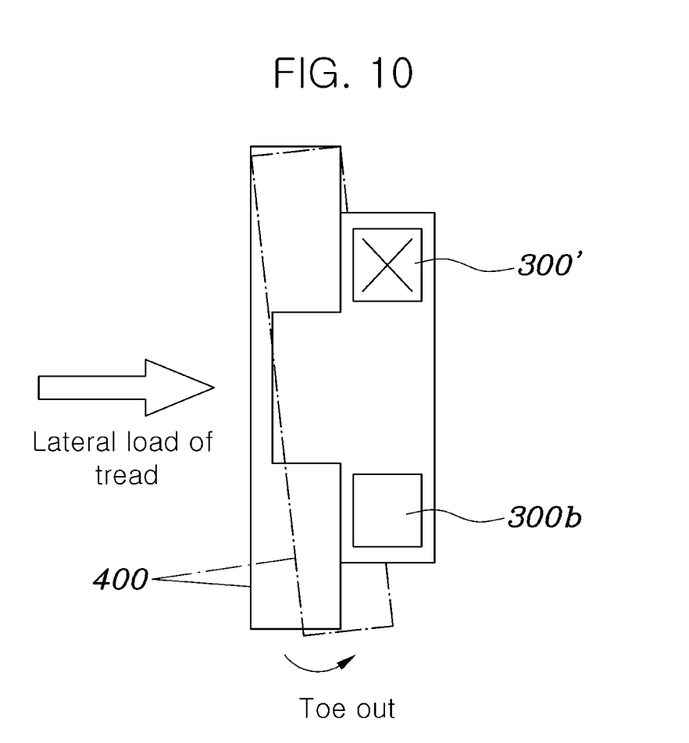
FIG. 10 is a view illustrating the behavior of a wheel in response to a lateral load input when the corner module of FIG. 8 is applied to the wheel.

Meanwhile, as illustrated in FIGS. 9 and 10, when the hardness of the front vibration insulator 300a is set to be lower than that of the rear vibration insulator 300b, a toe-in tendency may be induced in response to a lateral load input.

In addition, when the hardness of the rear vibration insulator 300b is set to be lower than that of the front vibration insulator 300a, a toe-out tendency may be induced in response to a lateral load input.

Accordingly, when the hardness of the front vibration insulator 300a is set to be lower than that of the rear vibration insulator 300b for the front wheel 400a to induce toe-out and the hardness of the front vibration insulator 300a is set to be higher than that of the rear vibration insulator 300b for the rear wheel 400b to induce toe-in, an understeer characteristic can be secured at the time of turning, and as a result, the R&H performance of the vehicle can be improved.

Although embodiments of the present disclosure have been described and illustrated in conjunction with only the above-described particular embodiments thereof, it will be apparent to those skilled in the art that various changes and modifications may be made to the embodiments of the present disclosure without departing from the technical idea of the present disclosure, and these changes and modifications fall within the scope of the appended claims.

What is claimed is:

1. A corner module comprising:
a steering unit configured to receive torque from a steering motor;
a damper connected to the steering unit and connectable to a wheel; and
a vibration insulation structure disposed at a portion where the steering unit and the damper are connected to each other, wherein the vibration insulation structure comprises a lower bush and an upper bush stacked in a vertical direction, wherein a first end of the steering unit is rotatably couplable to a vehicle body and a bush assembly hole is disposed at a second end of the steering unit branched from the first end toward the damper.

2. The corner module of claim 1, further comprising a damper shaft disposed at an upper end of the damper and protruding upward through the bush assembly hole, wherein the lower bush and the upper bush are fitted onto the damper shaft and supported within the bush assembly hole.

3. The corner module of claim 2, further comprising a support portion protruding on an inner surface of the bush assembly hole.

4. The corner module of claim 3, wherein the lower bush and the upper bush are stacked in the vertical direction and assembled while being supported on upper and lower ends of the support portion, respectively.

5. The corner module of claim 2, further comprising a nut fastened to an upper end of the damper shaft, wherein the nut is configured to allow the lower bush and the upper bush to be pressed and assembled.

6. The corner module of claim 2, further comprising:
a spring seat fixed to the damper;
a spring seating surface disposed on the steering unit; and
a damper spring supported between the spring seat and the spring seating surface.

7. A corner module for a vehicle, the corner module comprising:
a steering unit configured to be rotatably coupled to a vehicle body and configured to receive torque from a steering motor;
dampers connected to the steering unit, wherein the dampers are configured to be connected between the steering unit and a wheel; and
a vibration insulation structure having different hardnesses at portions where the steering unit and the dampers are connected to each other.

8. The corner module of claim 7, wherein the dampers are disposed in front of and behind a location configured for a rotary shaft of the wheel, respectively.

9. The corner module of claim 7, wherein the vibration insulation structure comprises vibration insulators, the vibration insulators having different hardnesses at the portions where the steering unit and the dampers are connected.

10. The corner module of claim 9, wherein each of the vibration insulators has a structure in which a lower bush and an upper bush are stacked vertically.

11. The corner module of claim 7, wherein the vibration insulation structure comprises a vibration insulator at only one of the portions where the steering unit and the dampers are connected.

12. The corner module of claim 11, wherein the vibration insulator has a structure in which a lower bush and an upper bush are stacked vertically.

13. The corner module of claim 12, wherein the lower bush and the upper bush have different hardnesses.

14. The corner module of claim 13, wherein the lower bush has a higher hardness than the upper bush.

15. The corner module of claim 7, wherein:
the wheel comprises a front wheel and a rear wheel;
the dampers comprise a front damper and a rear damper;
for the front wheel, the vibration insulation structure for the front damper and the steering unit has a higher hardness than the vibration insulation structure for the rear damper and the steering unit; and
for rear wheel, the vibration insulation structure for the front damper and the steering unit has a lower hardness than the vibration insulation structure for the rear damper and the steering unit.

16. A vehicle comprising:
a vehicle body;
a corner module comprising:
a steering motor;
a steering unit configured to receive torque from the steering motor, the steering unit having a first end rotatably coupled to the vehicle body;
a damper connected between the steering unit and a wheel; and
a vibration insulation structure disposed at a portion where the steering unit and the damper are connected to each other, wherein the vibration insulation structure comprises a lower bush and an upper bush stacked in a vertical direction; and
a bush assembly hole disposed at a second end of the steering unit branched from the first end toward the damper.

17. The vehicle of claim 16, further comprising:
a damper shaft disposed at an upper end of the damper and protruding upward through the bush assembly hole, wherein the lower bush and the upper bush are fitted onto the damper shaft and supported within the bush assembly hole.

18. The vehicle of claim 17, further comprising a support portion protruding on an inner surface of the bush assembly hole, wherein the lower bush and the upper bush are stacked in the vertical direction and assembled while being supported on upper and lower ends of the support portion, respectively.

19. The vehicle of claim 17, further comprising:
a spring seat fixed to the damper;
a spring seating surface disposed on the steering unit; and
a damper spring supported between the spring seat and the spring seating surface.

20. The corner module of claim 1, wherein the lower bush and the upper bush have different hardnesses.

\* \* \* \* \*